United States Patent
Wehman

[11] 3,836,854
[45] Sept. 17, 1974

[54] ALARM CIRCUIT FOR MONITORING THE AMPLITUDE OF A-C VOLTAGES

[75] Inventor: Alan W. Wehman, Elyria, Ohio

[73] Assignee: Lorain Products Corporation, Lorain, Ohio

[22] Filed: July 2, 1973

[21] Appl. No.: 375,730

[52] U.S. Cl. .............. 324/133, 324/51, 340/248 B, 340/248 C
[51] Int. Cl. ...................... G01r 19/16, G01r 31/02
[58] Field of Search .................... 324/72.5, 133, 51; 340/248 A, 248 B, 248 C, 253 A; 307/235

[56] References Cited
UNITED STATES PATENTS

| | | | |
|---|---|---|---|
| 3,166,678 | 1/1965 | Fleshman et al. | 340/248 A |
| 3,184,729 | 5/1965 | Freedman et al. | 340/248 A |
| 3,437,928 | 4/1969 | Baker et al. | 324/133 |
| 3,624,503 | 11/1971 | Barrowcliff | 324/133 |
| 3,626,283 | 12/1971 | James et al. | 324/133 X |
| 3,769,577 | 10/1973 | Schnur et al. | 324/133 X |

Primary Examiner—Gerard R. Strecker
Attorney, Agent, or Firm—Edward C. Jason

[57] ABSTRACT

A circuit for rapidly and accurately indicating whether an a-c voltage has a magnitude greater than a predetermined minimum value. A two-state voltage comparing circuit establishes a first output voltage when the rectified a-c input voltage exceeds a preset reference voltage and establishes a second output voltage state when the rectified a-c input voltage is less than that reference voltage. A two-state switching circuit forces the comparing circuit to assume and remain in its first state for a preset time after it assumes its second state, the preset time being greater than the time required for an acceptably high a-c voltage to pass through the reference voltage region established by the comparing circuit, as the a-c voltage varies through zero volts twice during each full cycle thereof. A two-state output control circuit indicates an a-c voltage fault if and when the comparing circuit returns to its second state within a relatively short time after having been forced to assume its first state. In this manner actual a-c voltage faults are distinguished from the apparent a-c voltage faults which tend to occur each time the a-c voltage varies through zero.

13 Claims, 5 Drawing Figures

PATENTED SEP 17 1974  3,836,854
FIG. 1
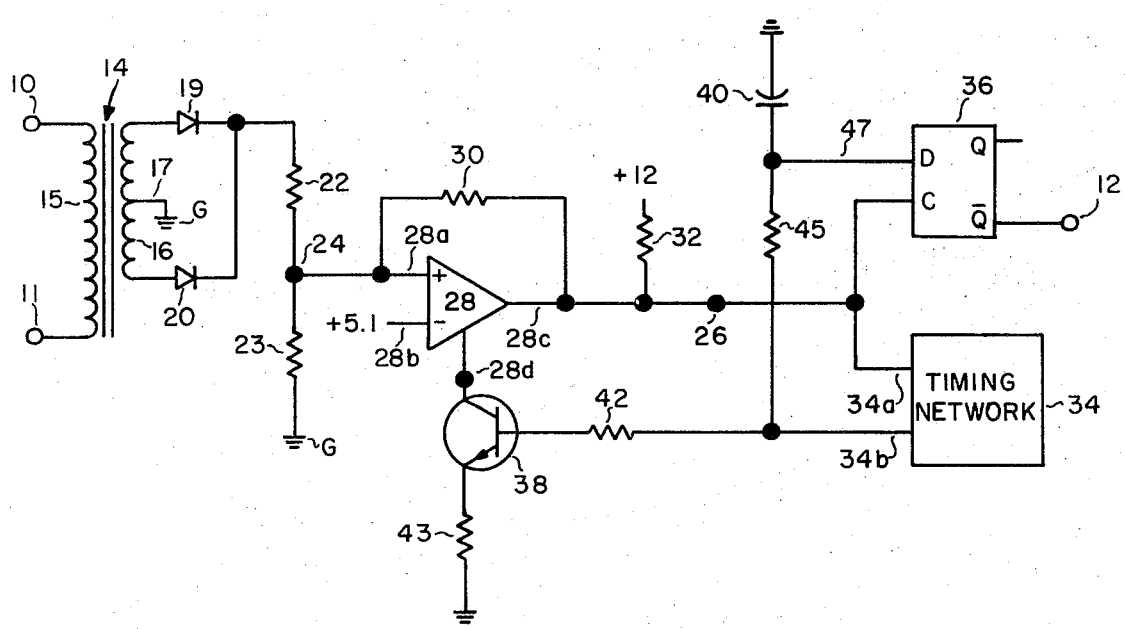
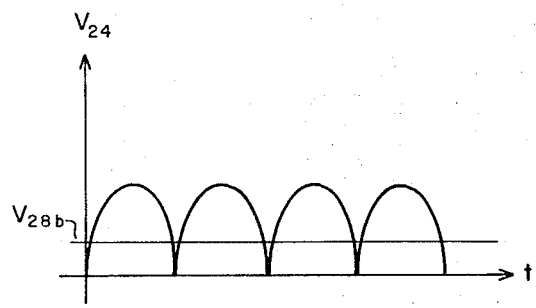
FIG. 2a
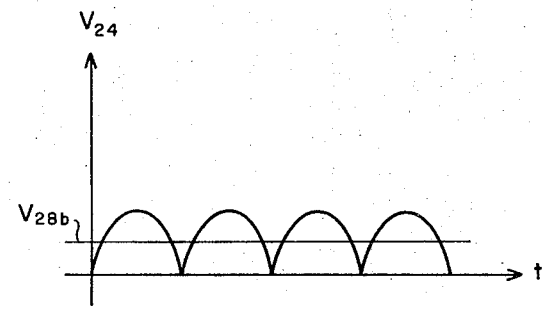
FIG. 2c
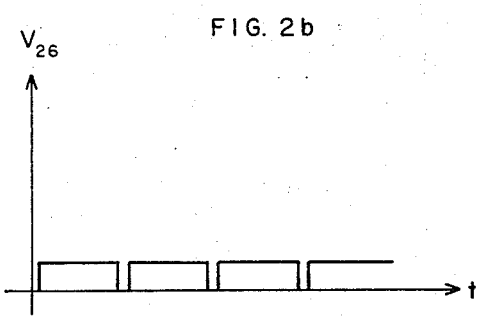
FIG. 2b
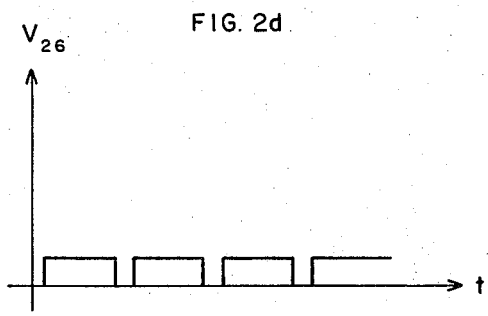
FIG. 2d

ALARM CIRCUIT FOR MONITORING THE AMPLITUDE OF A-C VOLTAGES

BACKGROUND OF THE INVENTION

The present invention relates to a-c voltage detecting circuits and is directed more particularly to a-c voltage detecting circuits which rapidly indicate whether the magnitude of an a-c voltage is above or below a preset minimum value.

Under circumstances where the magnitude of an a-c voltage determines whether that voltage is suitable for energizing an a-c load, it is necessary to provide a-c voltage detecting circuitry which can indicate when the magnitude of an a-c voltage falls below an acceptable minimum and which can give this indication in time to take any necessary action to protect the a-c load from the effects of insufficient voltage. In an inverter energized emergency power system adapted to transfer an a-c load from an a-c power line to an inverter or vice-versa when the magnitude of the line voltage or the inverter voltage falls below an acceptable minimum, for example, such circuits are necessary to detect a-c voltage faults and initiate a transfer from the faulty a-c source to the other source within a time sufficiently short to prevent the application of insufficient voltage to the a-c load. Such a-c voltage detecting circuits may also be used as a part of a larger control system which selects either a-c line operation or inverter operation depending upon such factors as the line or inverter frequency, the magnitude of the a-c load current, etc.

A serious problem in providing an accurate and rapid indication of the suitability of an a-c voltage is the fact that the a-c voltage passes periodically through zero. Since such periodic passages through zero do not indicate that the magnitude of the a-c voltage has fallen below an acceptable minimum, an a-c voltage detecting circuit must be so arranged as not to provide a fault indication merely because the a-c voltage has passed through zero. A-C voltage detection circuits must also be arranged so that occasional spikes or short lived transients in the a-c voltage do not produce an indication of an a-c voltage failure.

On the other hand, it is desirable that a-c voltage detecting circuits indicate the appearance or disappearance of an a-c voltage fault within a relatively small fraction of either half-cycle of that a-c voltage. This assures that any appropriate corrective action may be taken in time to prevent the consequences of a-c voltage faults (and the consequences of maintaining a fault indication after the a-c voltage has returned to an acceptable condition) from disturbing the operation of the system energized by the a-c voltage.

In accordance with the present invention, there is provided a-c voltage detecting circuitry which distinguishes between a condition in which the magnitude of an a-c voltage falls below an acceptable minimum and various apparent a-c voltage fault conditions such as the passages of the a-c voltage through zero and the occurrence of spikes in the a-c voltage. In addition, the circuit of the invention is adapted to provide a rapid indication of changes in the condition of the a-c voltage, both as the a-c voltage deviates from an acceptable condition and as the a-c voltage is restored to an acceptable condition.

SUMMARY OF THE INVENTION

It is an object of the invention to provide an improved a-c voltage detecting circuit for indicating whether the magnitude of an a-c voltage exceeds a preset minimum.

Another object of the invention is to provide an a-c voltage detecting circuit which indicates whether the magnitude of an a-c voltage has fallen below an acceptable minimum within a relatively small fraction of either half-cycle of that voltage.

Still another object of the invention is to provide an a-c voltage detecting circuit which indicates the return of an a-c voltage to an acceptable condition within a relatively small fraction of either half-cycle of that voltage.

Yet another object of the invention is to provide an a-c voltage detecting circuit having a two-state output voltage suitable for operating two-state control or alarm circuitry.

It is another object of the invention to provide an a-c voltage detecting circuit of the above character wherein the detecting circuitry resets itself upon the occurrence of an apparent fault and indicates the occurrence of an actual fault only if the fault recurs within a relatively short time after being reset.

Another object of the invention is to provide an a-c voltage detecting circuit of the above character wherein the reset condition is maintained for a period of time that exceeds the maximum duration of periodically occurring apparent fault conditions such as the passages of the a-c voltage through zero.

DESCRIPTION OF THE DRAWINGS

FIG. 1 is a schematic diagram of an exemplary circuit embodying the invention and FIGS. 2a, 2b, 2c and 2d show the waveforms of voltages which appear in the circuit of the invention under various operating conditions.

DESCRIPTION OF THE INVENTION

Referring to FIG. 1, there is shown an a-c voltage detecting circuit having a-c input terminals 10 and 11 and having an output terminal 12. Input terminals 10 and 11 are adapted to be connected to a source of a-c voltage such as the commercial a-c line or the output of an inverter. Output terminal 12 is adapted to be connected to any suitable control or alarm circuitry which is to be controlled in accordance with whether or not the a-c voltage between terminals 10 and 11 has an RMS value in excess of an acceptable minimum.

In the present embodiment the voltage detecting circuit of the invention includes an input transformer 14 having a primary winding 15 and a center-tapped secondary winding 16 including a center tap 17 connected to ground G. Transformer 14 serves to electrically isolate the detecting circuitry from the source of a-c input voltage and also allows the a-c input voltage to be stepped up or down, as required, to make that voltage compatible with the voltage levels present within the detecting circuitry.

The voltage detecting circuit of the invention also includes suitable diodes 19 and 20 which are connected as a full wave rectifying network between the ends of secondary winding 16 and ground G through a voltage divider comprising resistors 22 and 23. Diodes 19 and 20 rectify the a-c input voltage and thereby allow both the positive and negative half-cycles of the a-c input voltage to be compared to a single voltage reference. Voltage divider 22–23, in turn, allows a predetermined, controllable fraction of the rectified a-c voltage at the cathodes of diodes 19 and 20 to be applied to the remaining voltage detecting circuitry. It will be understood that if it is desirable for the magnitude of this controllable fraction to be adjustable, for example, to accommodate different ranges of a-c input voltages, resistors 22 and 23 may be replaced by a suitable potentiometer having its ends connected between diodes 19 and 20 and ground G and its wiper arm connected to junction 24.

To the end that the rectified a-c input voltage at junction 24 may be compared to a preset voltage reference and may control the potential at a point 26 in accordance with the result of that comparison, there is provided a comparator network including a suitable operational amplifier 28 having a positive or non-inverting input 28a, a negative or inverting input 28b and an output 28c. The comparator network also includes a positive feedback resistor 30 connected between amplifier output 28c and amplifier input 28a and an output pull-up resistor 32.

When the rectified input voltage at junction 24 exceeds the +5.1 volt reference voltage applied to amplifier input 28b, no current flows through amplifier output 28c. Under these conditions, comparator network output 26 is "pulled-up" to the potential of a +12 volt supply via pull-up resistor 32. Similarly, when the rectified input voltage at junction 24 is less than the +5.1 volt reference voltage applied to amplifier input 28b, current flows through amplifier output 28c to apply a low or ground voltage to comparator network output 26. During the course of the above comparison, feedback resistor 30 assures that changes in the level of the input voltage from below to above the reference voltage at amplifier input 28b and vice-versa produce rapid changes in the state of the voltage at comparator network output 26.

It will be understood that comparing the rectified a-c input voltage at junction 24 to a +5.1 volt reference voltage to determine if the rectified input voltage does or does not exceed that reference voltage produces the same result as comparing an unrectified a-c voltage of the same peak amplitude to +5.1 and −5.1 volt reference voltages to determine if the unrectified voltage is or is not between those reference voltages. This is because it takes the same amount of time for a rectified a-c voltage to fall from +5.1 volts to zero and rise again from zero to +5.1 volts as it does for an unrectified a-c voltage of the same peak amplitude to pass between +5.1 volts and −5.1 volts. Accordingly, any suitable two-state switching circuit which establishes a first output voltage state when an unrectified a-c voltage applied thereto exceeds either a positive or negative reference voltage and which establishes a second output voltage state when that unrectified a-c voltage is between those positive and negative reference voltages may be substituted for amplifier 28 and diodes 19 and 20.

Furthermore, because the peak value of the rectified a-c input voltage at junction 24 differs from the peak value of the a-c input voltage at terminals 10 and 11 by a factor dependent upon the turns ratio of transformer 14 and the voltage divider ratio of resistors 22 and 23, establishing a d-c reference voltage at amplifier input 28b is equivalent to establishing at input terminals 10 and 11 effective positive and negative reference voltages which differ from 5.1 volts by the same factor. If, for example, transformer 14 steps the input voltage down by a factor of two and resistors 22 and 23 apply one-half of the rectified input voltage to junction 24, the voltage at input terminals 10 and 11 may vary outside of input voltage limits ±20.4 volts (4 × 5.1 volts) to send comparator network output 26 to its high voltage state.

In addition to the control which inputs 28a and 28b exert over the state of the output of amplifier 28, the latter may also be controlled by a reset or strobe input 28d thereof. When no reset current flows through strobe input 28d, amplifier 28 operates in the manner described above to control comparator network output 26 in accordance with the magnitude of the rectified a-c input voltage at junction 24. When, however, sufficient reset current is drawn through strobe input 28d, comparator network output 26 is forced to assume its high state, without regard to magnitude of the rectified a-c input voltage at junction 24. Thus, strobe input 28d of amplifier 28 serves to override or disable the normal comparing activity of the comparator network.

In view of the foregoing, it will be seen that if the turns ratio of transformer 14 and the voltage divider ratio of resistors 22 and 23 allow the rectified a-c input voltage at junction 24 to rise above the +5.1 volt voltage reference at amplifier input 28b during a substantial portion of each half-cycle, comparator network output 26 will, in the absence of reset current flow, be in its high state when the a-c input voltage is in the high amplitude portion of each positive or negative half-cycle thereof. It will also be seen that, in the absence of reset current flow, comparator network output 26 will be in its low state during the low magnitude portion of each positive and negative half-cycle thereof, that is, at or near the zero voltage points of the a-c input voltage waveform. Thus, as the a-c input voltage varies over successive positive and negative half-cycles, comparator network output 26 will be in its high state except during those periods when the a-c input voltage is at or near zero.

In the present embodiment, the turns ratio of transformer 14 and the voltage divider ratio of resistors 22 and 23 are so related to the reference voltage at amplifier input 28b that when no reset current flows and the a-c input voltage has a satisfactory magnitude, as shown in FIG. 2a, comparator network output 26 spends a relatively high proportion of each half-cycle in its high state and a relatively low portion thereof in its low state, as shown in FIG. 2b. On the other hand, the turns ratio of transformer 14 and the voltage divider ratio of resistors 22 and 23 are so related to the reference voltage at amplifier input 28b that no reset current flows and the a-c input voltage has an unsatisfactorily low magnitude, as shown in FIG. 2c, comparator network output 26 spends a relatively lower portion of each half-cycle in its high state and spends a relatively higher proportion of each half-cycle in its low state, as shown in FIG. 2d. As will be described more fully presently, the remaining circuitry of the voltage detecting circuit of the invention is arranged to distinguish between these conditions and thereby determine if the a-c input voltage does or does not have a satisfactory magnitude.

To the end that the occurrence of normal periods of low state voltage at comparator network output 26 may be distinguished from abnormal or prolonged periods of low state voltage thereat, there is provided timing means 34, output control means 36, switching means 38 and storage means 40. Timing means 34 which may, for example, comprise a one-shot multivibrator, serves to generate at the output 34b thereof a reset or timing pulse of predetermined duration each time that comparator network output 26 changes from its high state to its low state to apply a negative-going voltage transition to input 34a of timing means 34. Switching means 38 which may, for example, comprise a suitable NPN transistor, serves to reset operational amplifier 28 via strobe input 28d thereof when and during the time that timing network 34 establishes a reset pulse on output 34b thereof and thereby energizes the base-emitter circuit of transistor 38 through resistors 42 and 43. Thus, for a time determined by the duration of the reset pulse from timing network 34, comparator network output 26 is forced to assume its high state following each negative-going voltage transition at that output.

When the a-c input voltage has an acceptably high value, the voltage at comparator network output 26 will remain high after the termination of each reset pulse from timing network 34. This is because the duration of each such pulse is preset to be greater than the maximum time required for an acceptably high a-c voltage to pass between the input voltage limits established by amplifier 28 as, for example, during the course of each a-c voltage passage through zero. When, on the other hand, the a-c input voltage does not have an acceptably high value, comparator network output 26 will return low substantially immediately after the termination of a reset pulse from timing network 34. This is because the duration of the reset pulse is not set at a value so great that an unacceptably low a-c voltage can pass between the input voltage limits established by amplifier 28 during the reset pulse. Thus, a low at comparator output network 26 which follows too quickly the termination of the reset pulse from timing network 34 indicates that a-c input voltage has failed to exceed the acceptable minimum.

In the present embodiment, the voltage detecting circuit of the invention maintains circuit output 12 in a continuously high condition, to indicate the absence of an a-c input voltage fault, when comparator network output 26 remains high following the termination of a reset pulse, and drives circuit output 12 low, to indicate the presence of an a-c input voltage fault, when comparator network output 26 returns low relatively soon after the end of a reset pulse. To the end that this may be accomplished, a storage device which here takes the form of a capacitor 40 is connected between timing network output 34b and ground through a resistor 45 and an output control network which here takes the form of a flip-flop 36 of the well-known D type is connected to comparator network output 26, to storage capacitor 40 and to circuit output 12.

D-type flip-flop 36 is provided with a signal input D, a clock or timing input C and first and second outputs Q and $\bar{Q}$ which are normally in opposite states. D-type flip-flop 36 serves to conform the state of output Q to the state of input D upon the occurrence of a high transition at input C thereof and, at the same time, causes output $\bar{Q}$ thereof to assume a state opposite to that at input D. Capacitor 40 serves as a storage element by charging from timing network output 34b, through resistor 45, during the course of each reset pulse and is adapted to discharge through resistor 45 and the internal circuitry of timing network 34 within a predetermined time after the termination of each reset pulse.

In the present embodiment the time constants governing the charging and discharging of capacitor 40 are selected so that capacitor 40 charges to substantially the peak amplitude of each reset pulse during the course of each reset pulse and discharges within a relatively short time after the termination of each reset pulse. In other words, capacitor 40 renders conductor 47 high during the course of each reset pulse and is adapted to maintain a high on that conductor for a relatively short time following the termination of the reset pulse. Accordingly, it will be seen that if conductor 47 is high and timing network 34 is not producing a reset pulse, it is known that a reset pulse has occurred relatively recently.

As previously described, when the a-c input voltage is acceptably high, comparator network output 26 is normally high and is periodically driven low as the a-c input voltage passes through zero. In addition, comparator network output 26 is forced to assume its high state by and during each reset pulse and normally remains in that high condition, after the end of the reset pulse, until the a-c input voltage causes another negative-going transition at comparator network output 26.

Since comparator network output 26 remains in its high state during a relatively large proportion of each input voltage half-cycle, capacitor 40 is normally sufficiently discharged between negative-going transitions to apply a low to conductor 47 each time that a negative-going transition occurs at comparator network output 26. It will, therefore, be seen that when the a-c input voltage is acceptably high, input D of flip-flop 36 is low each time that a negative-going transition at comparator network output 26 causes timing network 34 to force that output into its high state. As a result, flip-flop input D is low each time that a positive-going transition occurs at comparator network output 26, causing flip-flop output Q to be continuously low and causing flip-flop output $\bar{Q}$ to be continuously high.

When the magnitude of the input voltage falls unacceptably low, however, comparator network output 26 does not remain high immediately after the termination of each reset pulse but instead undergoes a second negative-going transition to indicate that the a-c input voltage is still below an acceptable minimum. This second negative-going transition causes timing network 34 to generate a second reset pulse and thereby reset comparator network output 26 high for a second time. If this second reset or high-going transition of comparator network output 26 occurs so soon after the end of the previous reset pulse that capacitor 40 still applies a high to conductor 47 (and input D of flip-flop 36,) flip-flop output $\bar{Q}$ will be driven from its normally high state to its low state to indicate the occurrence of an a-c input voltage fault. Thus, flip-flop 36 indicates the existence of an a-c voltage fault only when the comparator network is reset within a relatively short time after having been reset.

In view of the foregoing it will be seen that circuit output 12 is not changed from its high or normal state to its low or fault-indicating state merely because the a-c input voltage has, by passing through zero, caused low transition to appear at comparator network output 26. Instead, circuit output 12 is made to assume its low state only after a negative-going transition at comparator output 26 occurs within so short a time after the occurrence of the previous negative-going transition thereat, that the second negative-going transition cannot be due to any circumstance but a failure of the a-c input voltage to remain above an acceptable minimum. Thus, the circuit of the invention is adapted to withhold judgment as to the existence of an input voltage fault upon the occurrence of each single negative-going transition at comparator network output 26 and to give the input voltage a second chance to establish its suitability to energize a load by indicating a fault condition only when a second negative-going transition occurs relatively soon after the preceeding negative-going transition.

As previously described, the duration of each reset pulse is fixed by the relatively short time required for the lowest acceptable a-c input voltage to pass between the input voltage limits established by amplifier 28. Since, in addition, fault indications occur, if at all, within a short time after the termination of a reset pulse, it will be seen that the time between the occurrence of an input voltage fault and the occurrence of a fault indication is approximately equal to the duration of a reset pulse. Accordingly, it will be seen that indications of a-c input voltage faults can be made to occur quickly after the occurrence of those faults as, for example, within a small fraction of one half-cycle of the a-c voltage being monitored.

In utilizing the circuit of the invention in an environment in which the a-c voltage being monitored undergoes periods of transient voltage fluctuation as, for instance, upon sudden changes in the level of a-c load current, it may be desirable to set the duration of each reset pulse to a value somewhat greater than that described heretofore. This is because increasing the duration of each reset pulse reduces the sensitivity of the voltage detecting circuitry, that is, reduces the tendency thereof to indicate a-c voltage faults in the presence of longer and longer a-c voltage excursions outside of the input voltage limits set by comparator 28. Such insensitivity is desirable because it allows the voltage detecting circuitry to withhold a fault indication during periods of transient a-c voltage fluctuation when the magnitude and frequency of the a-c voltage vary over wider than ordinary limits as a necessary result of the dynamic characteristics of the a-c source and not as a result of a-c voltage faults.

Generally speaking, after circuit output 12 has gone low to indicate a fault condition, the subsequent return of the a-c input voltage to an acceptabe condition returns circuit output 12 to its high state substantially instantaneously. This is because after circuit output 12 assumes its low or fault-indicating state, all that is required to return that output to its high or normal state is that capacitor 40 be discharged at the time when the a-c input voltage rises high enough to drive amplifier input 28a positive from amplifier input 28b and thereby cause a positive-going transition to occur at comparator network output 26 and flip-flop input C. Accordingly, it will be seen that the longest time required for a restoration of the input voltage to an acceptable condition to trigger an indication of that restoration is equal to the relatively short discharge time of capacitor 40. In addition it will be seen that once a fault condition persists long enough for that capacitor to discharge, any subsequent restoration of the a-c voltage to an acceptable condition will substantially instantaneously change the state of circuit output 12. Thus, the circuit of the invention is as rapid in indicating the restoration of the a-c input voltage to an acceptable condition as it is in indicating the occurrence of an a-c voltage fault.

In view of the foregoing, it will be seen that an a-c voltage detecting circuit constructed in accordance with the invention is adapted to initiate or terminate an a-c voltage fault indication within a relatively small fraction of either half-cycle of the a-c voltage being monitored and yet is adapted not to establish a fault indication in the presence of an acceptably high a-c voltage merely because that voltage varies through zero twice during each full cycle thereof.

It will be understood that the embodiment shown herein is for explanatory purposes only and may be changed or modified without departing from the spirit and scope of the appended claims.

What is claimed is:

1. In a circuit for detecting whether an a-c voltage has a satisfactory magnitude, in combination, an a-c input, a circuit output, switching means having an input and an output, said switching means serving as means for establishing a first voltage at the output thereof when the voltage at the a-c input varies outside of predetermined input voltage limits and for establishing a second voltage at the output thereof when the voltage at the a-c input does not vary outside of said input voltage limits, means for connecting the a-c input to the input of the switching means, resetting means for forcing the switching means to establish said first voltage for a preset period following the establishment of said second voltage, means for connecting the resetting means in voltage responsive relationship to the output of the switching means, means for connecting the resetting means to the switching means to control the reset of the switching means, and output control means connected to the switching means and the resetting means for establishing at the circuit output a voltage which indicates that the voltage at the a-c input has a satisfactory magnitude when the switching means continues to establish said first voltage after the resetting means stops resetting the switching means and for establishing at the circuit output a voltage which indicates that the voltage at the a-c input does not have a satisfactory magnitude when the switching means reestablishes said second voltage within a relatively short time after the resetting means stops resetting the switching means.

2. A circuit as set forth in claim 1 in which said preset period has a duration greater than the time required for an a-c voltage which has a satisfactory magnitude to vary between said input voltage limits.

3. A circuit as set forth in claim 1 in which the switching means comprises an operational amplifier having a first input connected to a source of reference voltage and having a second input connected to the a-c input.

4. A circuit as set forth in claim 1 in which the resetting means comprises a one-shot multivibrator responsive to the voltage at the output of the switching means.

5. A circuit as set forth in claim 1 in which the output control means comprises a flip-flop and a capacitor and which includes means for charging the capacitor when the resetting means is resetting the switching means, and means for connecting the flip-flop to the switching means and to the capacitor.

6. In a circuit for detecting whether an a-c voltage has a satisfactory magnitude, in combination, an a-c input, a circuit output, comparing means having an input and an output, the comparing means serving as means for establishing a first voltage at the output thereof when the voltage at the a-c input varies outside of predetermined input voltage limits and for establishing a second voltage at the output thereof when the voltage at the a-c input does not vary outside of said input voltage limits, means for connecting the a-c input to the input of the comparing means, timing means having an input and an output, the timing means serving as means for establishing a pulse of predetermined duration at the output thereof each time that said second voltage appears at the output of the comparing means, means for connecting the comparing means to the input of the timing means, means for connecting the timing means to the comparing means to cause the comparing means to establish said first voltage while a pulse appears at the output of the timing means, output control means for establishing at the circuit output a voltage which indicates that the voltage at the a-c input does not have a satisfactory magnitude when the comparing means establishes said second voltage within a relatively short time after the end of a pulse from the timing means, and means for connecting the output control means to the circuit output, to the comparing means and to the timing means.

7. In a circuit for detecting whether an a-c voltage has a satisfactory magnitude, in combination, an a-c input, a circuit output, comparing means having an input and an output, the comparing means serving as means for establishing a first voltage at the output thereof when the voltage at the a-c input exceeds predetermined input voltage limits and for establishing a second voltage at the output thereof when the voltage at the a-c input does not exceed said input voltage limits, means for connecting the a-c input to the input of the comparing means, timing means having an input and an output, the timing means serving as means for establishing a timing pulse of preset duration at the output thereof after said second voltage appears at the output of the comparing means, means for connecting the output of the comparing means to the input of the timing means, switching means for forcing the comparing means to establish said first voltage during the time that a pulse appears at the output of the timing means, means for connecting the switching means to the comparing means and to the output of the timing means, storage means for establishing a voltage indicative of the occurrence of each of the timing pulses for a predetermined time after the termination of each of the timing pulses, means for connecting the storage means to the output of the timing means, output control means for applying to the circuit output a voltage which varies in accordance with the voltage across the storage means and the voltage at the output of the comparing means, the output control means being adapted to apply to the circuit output a voltage which indicates that the voltage at the a-c input does not have a satisfactory magnitude when the comparing means energizes the timing means at a time when a substantial voltage remains across the storage means.

8. A circuit as set forth in claim 7 in which said timing means is adapted to produce a pulse having a duration greater than the time required for an a-c voltage which has a satisfactory magnitude to vary between said input voltage limits.

9. In a circuit for detecting whether an a-c voltage has a satisfactory magnitude, in combination, an a-c input, comparing means having an input and an output, the comparing means serving as means for establishing a first voltage at the output thereof when the voltage at the input thereof exceeds a predetermined value and for establishing a second voltage at the output thereof when the voltage at the input thereof does not exceed said predetermined value, rectifying means for connecting the a-c input to the input of the comparing means, timing means having an input and an output, the timing means serving as means for establishing a pulse of preset duration at the output thereof after said second voltage is established by the comparing means, means for connecting the output of the comparing means to the input of the timing means, switching means for forcing the comparing means to establish said first voltage when a pulse is present at the output of the timing means, means for connecting the switching means to the comparing means and to the output of the timing means, storage means for establishing voltages indicative of the occurrences of each of said pulses for predetermined times after the terminations of each of said pulses, output control means having first and second inputs and an output, the control means serving as means for applying to the output thereof a voltage which indicates an input voltage fault when the storage means applies a substantial voltage to the first input thereof and the comparing means applies a predetermined voltage transition to the second input thereof, means for connecting the storage means to the first input of the output control means and means for connecting the comparing means to the second input of the output control means.

10. In a circuit for detecting whether an a-c voltage has a satisfactory magnitude, in combination, an a-c input, an operational amplifier having an input and an output, the operational amplifier serving as means for establishing a first voltage at the output thereof when the voltage at the input thereof exceeds a predetermined reference voltage and for establishing a second voltage at the output thereof when the voltage at the input thereof does not exceed said predetermined reference voltage, rectifying means for connecting the a-c input to the operational amplifier, a timing network having an input and an output and serving as means for establishing a pulse at the output thereof each time that an energizing voltage is applied to the input thereof, means for connecting the output of the operational amplifier to the input of the timing network, a flip-flop having first and second inputs and an output, switching means for forcing the operational amplifier to establish said first voltage while a pulse appears at the output of the timing network, means for connecting the switching means to the operational amplifier and to the output of the timing network, a capacitor adapted to charge during the times that pulses appear at the output of the timing network and adapted to discharge within preset times after the terminations of said pulses, means for connecting the capacitor to the first input of the flip-flop and means for connecting the operational amplifier to the second input of the flip-flop, the flip-flop serving to establish at the output thereof a voltage which indicates an input voltage fault when the capacitor applies a substantial voltage to the first input of the flip-flop and the output of the operational amplifier undergoes a transition from the first voltage to the second voltage.

11. A circuit as set forth in claim 10 in which the flip-flop is a D-type flip-flop, in which said first input of the flip-flop is the signal input thereof, and in which said second input of the flip-flop is the clock input thereof.

12. A circuit as set forth in claim 10 in which the operational amplifier has a strobe input and in which the switching means comprises a transistor connected to the strobe input and adapted to conduct during the times that pulses appear at the output of the timing network.

13. A circuit as set forth in claim 10 in which said timing network is adapted to produce an output pulse having a duration greater than the time required for an a-c voltage which has a satisfactory magnitude to vary between a positive value in excess of the reference voltage and a negative value in excess of the reference voltage.

* * * * *